United States Patent
Desai et al.

(10) Patent No.: US 10,233,296 B2
(45) Date of Patent: Mar. 19, 2019

(54) METHOD OF FORMING CREPED THIN FILM-LIKE STRUCTURES FROM FROTHED CHEMISTRY

(71) Applicant: Kimberly-Clark Worldwide, Inc., Neenah, WI (US)

(72) Inventors: Keyur Desai, Alpharetta, GA (US); Jian Qin, Appleton, WI (US); Jeffrey Frank Jurena, Appleton, WI (US); Frank Paul Abuto, Roswell, GA (US); Susan Elaine Shawver, Roswell, GA (US); Donald Eugene Waldroup, Roswell, GA (US); Deborah Joy Calewarts, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 353 days.

(21) Appl. No.: 13/905,429

(22) Filed: May 30, 2013

(65) Prior Publication Data
US 2014/0357743 A1   Dec. 4, 2014

(51) Int. Cl.
C08J 5/18      (2006.01)
B29C 41/08    (2006.01)

(52) U.S. Cl.
CPC .............. *C08J 5/18* (2013.01); *B29C 41/085* (2013.01); *C08J 2323/08* (2013.01)

(58) Field of Classification Search
CPC ........................................................ C08J 9/30
See application file for complete search history.

(56) References Cited

U.S. PATENT DOCUMENTS

| | | | |
|---|---|---|---|
| 2,897,109 | A | 7/1959 | Voigtman |
| 3,188,372 | A | 6/1965 | Roos |
| 3,484,839 | A | 12/1969 | Neumann |
| 3,810,280 | A | 5/1974 | Munchbach et al. |
| 3,865,078 | A | 2/1975 | De Howitt et al. |
| 3,926,716 | A | 12/1975 | Bates |
| 4,237,818 | A | 12/1980 | Clifford et al. |

(Continued)

FOREIGN PATENT DOCUMENTS

| | | |
|---|---|---|
| DE | 2 063 961 A1 | 7/1972 |
| EP | 1 619 016 A1 | 1/2006 |

(Continued)

*Primary Examiner* — Michael M Dollinger
*Assistant Examiner* — Christina H Wales

(57) ABSTRACT

A method is presented for forming a collapsed foam film-like structure, the method including positioning a composition applicator adjacent to a hot non-permeable dryer surface, producing a first frothed dispersion or frothed solution from a first dispersion or solution, applying the first frothed dispersion or frothed solution to the dryer surface, allowing the first frothed dispersion or frothed solution to convert to a collapsed foam film-like structure, and scraping the collapsed foam film-like structure from the dryer surface. The method can further include producing a second dispersion or solution, blending the first dispersion or solution and the second dispersion or solution, frothing the blended dispersion or solution, applying the blended frothed dispersion or frothed solution to the dryer surface, and allowing the frothed dispersion or frothed solution to convert to a collapsed foam film-like structure.

17 Claims, 3 Drawing Sheets

(56) References Cited

U.S. PATENT DOCUMENTS

| | | |
|---|---|---|
| 4,276,339 A | 6/1981 | Stoveken |
| 4,353,993 A | 10/1982 | McCrossin |
| 4,364,784 A | 12/1982 | Van Wersch et al. |
| 4,402,200 A | 9/1983 | Clifford et al. |
| 4,448,818 A | 5/1984 | Hartog et al. |
| 4,483,894 A | 11/1984 | Porter et al. |
| 4,620,983 A | 11/1986 | Zimmer |
| 4,655,056 A | 4/1987 | Zeiffer |
| 5,429,840 A | 7/1995 | Raterman et al. |
| 5,494,744 A | 2/1996 | Everhart et al. |
| 5,704,101 A | 1/1998 | Majors et al. |
| 5,843,058 A | 12/1998 | Quist |
| 5,942,085 A | 8/1999 | Neal et al. |
| 6,187,138 B1 | 2/2001 | Neal et al. |
| 6,241,713 B1 | 6/2001 | Gross et al. |
| 6,261,679 B1 | 7/2001 | Chen et al. |
| 6,271,276 B1 | 8/2001 | Gribble et al. |
| 6,395,088 B1 | 5/2002 | Zeiffer |
| 6,511,734 B1 | 1/2003 | Wagner |
| 6,582,555 B2 | 6/2003 | Capizzi et al. |
| 6,623,837 B2 | 9/2003 | Morman et al. |
| 6,632,974 B1 | 10/2003 | Suzuki et al. |
| 6,642,430 B1 | 11/2003 | Busam et al. |
| 6,730,171 B2 | 5/2004 | Capizzi et al. |
| 6,761,800 B2 | 7/2004 | Capizzi |
| 6,797,116 B2 | 9/2004 | Capizzi |
| 6,797,319 B2 | 9/2004 | Capizzi |
| 6,814,806 B2 | 11/2004 | Zeiffer et al. |
| 6,835,418 B2 | 12/2004 | Capizzi |
| 6,852,196 B2 | 2/2005 | Capizzi |
| 6,858,256 B2 | 2/2005 | Zeiffer |
| 7,431,771 B2 | 10/2008 | Zeiffer et al. |
| 7,439,276 B2 | 10/2008 | Strandburg et al. |
| 7,528,080 B2 | 5/2009 | Prieto et al. |
| 7,812,062 B2 | 10/2010 | Strandburg et al. |
| 8,012,285 B2 | 9/2011 | Goldstein et al. |
| 8,063,128 B2 | 11/2011 | Moncla et al. |
| 2004/0099388 A1 | 5/2004 | Chen et al. |
| 2004/0143046 A1 | 7/2004 | Goldstein |
| 2005/0136242 A1 | 6/2005 | Yahiaoui et al. |
| 2006/0102071 A1 | 5/2006 | Zeiffer et al. |
| 2006/0124261 A1 | 6/2006 | Lindsay et al. |
| 2006/0189240 A1 | 8/2006 | Taylor et al. |
| 2007/0044930 A1 | 3/2007 | Vinson et al. |
| 2007/0284069 A1* | 12/2007 | Dyer ................ A47K 10/16 162/112 |
| 2008/0041543 A1* | 2/2008 | Dyer ................ A61K 8/0208 162/111 |
| 2008/0076844 A1 | 3/2008 | Van Sumeren et al. |
| 2008/0128101 A1 | 6/2008 | Furman et al. |
| 2008/0176968 A1 | 7/2008 | Vansumeren et al. |
| 2008/0200891 A1 | 8/2008 | Kim et al. |
| 2008/0295985 A1 | 12/2008 | Moncla et al. |
| 2009/0088037 A1 | 4/2009 | Covelli et al. |
| 2010/0036024 A1 | 2/2010 | Menning |
| 2010/0155004 A1 | 6/2010 | Wang et al. |
| 2010/0159200 A1 | 6/2010 | Soerens et al. |
| 2010/0227520 A1 | 9/2010 | Claasen et al. |
| 2010/0236735 A1* | 9/2010 | Goulet ................ D21H 17/34 162/112 |
| 2010/0255207 A1* | 10/2010 | Neubauer et al. ......... 427/389.9 |
| 2012/0028004 A1 | 2/2012 | Qin et al. |
| 2012/0160400 A1* | 6/2012 | Calewarts et al. ............ 156/183 |
| 2013/0157012 A1* | 6/2013 | Qin ................ D04H 13/007 428/153 |
| 2013/0157537 A1 | 6/2013 | Jackson et al. |
| 2014/0099469 A1* | 4/2014 | Abuto ................ A61Q 19/00 428/88 |
| 2014/0102650 A1* | 4/2014 | Qin ................ A61K 8/39 162/111 |

FOREIGN PATENT DOCUMENTS

| | | |
|---|---|---|
| GB | 758 745 A | 10/1956 |
| GB | 934 071 A | 8/1963 |
| JP | 04-135675 A | 5/1992 |
| JP | 08-260327 A | 10/1996 |
| JP | 2005-193693 A | 7/2005 |
| WO | WO 1994/022502 A1 | 10/1994 |
| WO | WO 2000/007045 A1 | 2/2000 |
| WO | WO 2004/061182 | 7/2004 |
| WO | WO 2004/061185 | 7/2004 |
| WO | WO 2004/069424 A2 | 8/2004 |
| WO | WO 2009/045731 A2 | 4/2009 |
| WO | WO 2012/015624 A1 | 2/2012 |

* cited by examiner

METHOD OF FORMING CREPED THIN FILM-LIKE STRUCTURES FROM FROTHED CHEMISTRY

BACKGROUND

Polymer films for engineering and commercial applications are typically made using cast or blown film manufacturing processes. Solvent casting has also been employed to produce film-like structures where the material that is desired to be formed into a film is not melt processable. The physical properties of films produced using melt extrusion technologies is governed by the polymer and formulation used as well the process configuration. The ability to produce very thin films can be challenging and requires careful selection of the polymer used as well as other process variable such as the film die configuration. The ability to produce a thin film-like structure without the limitations of a melt extrusion process would be advantageous to producing film-like structures with unique physical characteristics and would allow a broader range of polymers to be used.

SUMMARY

Recent developments related to the process of collapsing a frothed dispersion onto a heated cylinder demonstrated the ability to produce thin polymeric film-like structures without the limitations of polymer rheology and stability required by melt extrusion processes. This novel approach to producing thin polymeric film-like structures has many advantages including the ability to select from a range of polymers that are not necessarily melt processable to produce substrates with unique tactile and physical properties.

The ability to form a very thin film-like structure from a polymeric dispersion provides a unique opportunity to leverage a wide range of chemistries to produce substrates that exhibit unique properties.

The present disclosure includes a method of forming a collapsed foam film-like structure, the method including positioning a composition applicator adjacent to a heated non-permeable dryer surface, producing a first frothed dispersion or frothed solution from a first dispersion or solution, applying the first frothed dispersion or frothed solution to the dryer surface, allowing the first frothed dispersion or frothed solution to convert to a collapsed foam film-like structure, and scraping the collapsed foam film-like structure from the dryer surface.

The present disclosure also includes a method of forming a collapsed foam film-like structure, the method including positioning a composition applicator adjacent to a heated non-permeable dryer surface, producing a first dispersion or solution, producing a second dispersion or solution, and blending the first dispersion or solution and the second dispersion or solution. The method also includes frothing the blended dispersion or solution, applying the blended frothed dispersion or frothed solution to the dryer surface, allowing the frothed dispersion or frothed solution to convert to a collapsed foam film-like structure, and scraping the collapsed foam film-like structure from the dryer surface.

The present disclosure also includes a film-like structure including a collapsed foam film-like structure having a creped macrostructure and defining a horizontal plane, wherein the collapsed foam film-like structure includes entrapped voids of air that are generally perpendicular to the horizontal plane.

Other features and aspects of the present disclosure are discussed in greater detail below.

BRIEF DESCRIPTION OF DRAWINGS

The foregoing and other features and aspects of the present disclosure and the manner of attaining them will become more apparent, and the disclosure itself will be better understood by reference to the following description, appended claims and accompanying drawings, where:

Figure 1:
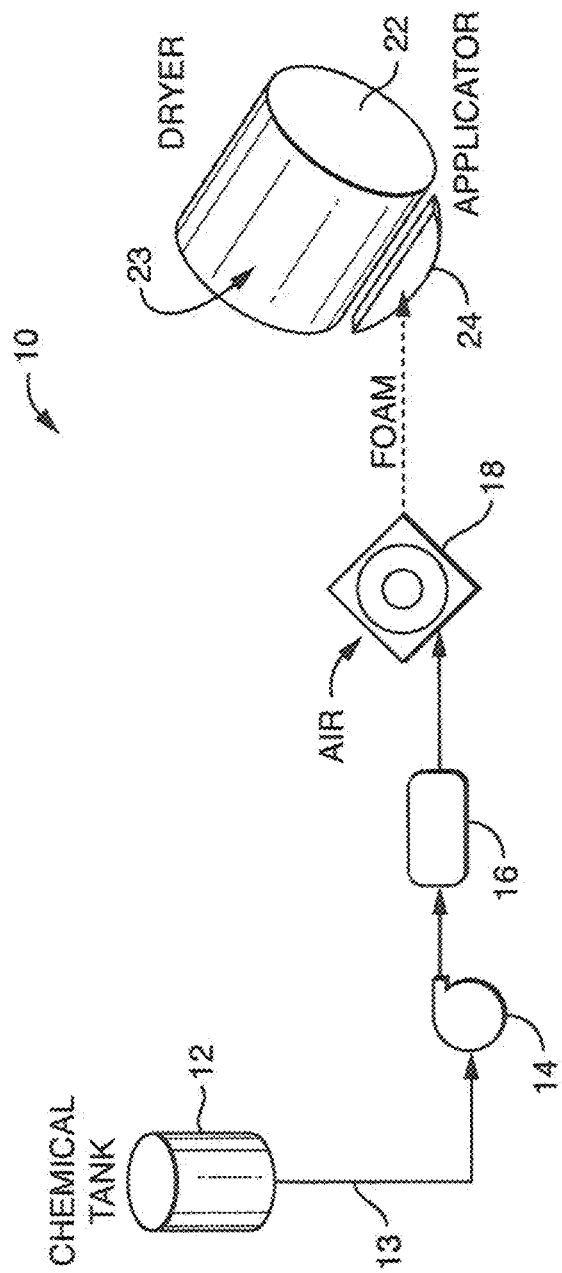
FIG. 1 is a schematic view of process steps used to create one aspect of a froth and film-like structure according to the present disclosure.

Repeat use of reference characters in the present specification and drawings is intended to represent the same or analogous features or elements of the present disclosure. The drawings are representational and are not necessarily drawn to scale. Certain proportions thereof might be exaggerated, while others might be minimized.

DETAILED DESCRIPTION

"Creping" as defined herein occurs when a polymer is scraped off of a dryer surface (e.g. a Yankee dryer surface or heated cylinder) with a doctor blade. For example, as will be explained in more detail herein, a frothed dispersion or solution is applied to a heated dryer that evaporates water from the frothed dispersion or solution. The heat of the dryer collapses the frothed dispersion or solution into a polymer film-like structure.

"Froth" as defined herein is a liquid foam. According to the present disclosure, when the frothable dispersion or solution of the present disclosure is heated, it will not form a solid foam structure. Instead, when applied to a heated surface, the frothable dispersion or solution collapses into a substantially continuous film-like structure that can include a particular level of porosity.

"Nonwoven" is defined herein as a class of fabrics generally produced by attaching fibers together. Nonwoven fabric is made by mechanical, chemical, thermal, adhesive, or solvent means, or any combination of these. Nonwoven manufacture is distinct from weaving, knitting, or tufting. Nonwoven fabrics can be made from synthetic thermoplastic polymers and/or natural polymers such as cellulose. Cellulosic tissue and spunbond fabrics are examples of nonwoven materials.

It should be noted that, when employed in the present disclosure, the terms "comprises," "comprising" and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

The ability to form a very thin film-like layer from a polymeric dispersion provides a unique opportunity to leverage a wide range of chemistries to produce substrates that exhibit unique properties.

Furthermore, this novel process also provides a way to incorporate solid particles and/or fiber into the film-like structure. Differently shaped particles and fibers can be added into a dispersion, a solution, or a dispersion/solution mixture. The particles/fibers can also be added onto the dryer surface, when the film-like structure is not completely dried and/or at semi-molten state, to stay on the surface of the film-like structure to achieve different tactile aesthetics.

The frothed dispersion or solution has enough structural integrity to reach the dryer surface. By creating a frothed dispersion or solution according to the present disclosure, a frothed dispersion or solution applicator can be placed in much closer proximity to the dryer surface than can be done in previous arrangements.

Foaming Agents:

Most commercial foaming agents are suitable for creating the froth of the present disclosure. Suitable foaming agents include polymeric materials in liquid form or in solution. These foaming agents can be divided into four groups depending on function:

(1) Air Entrapment Agent—used to enhance a liquid's (dispersion, solution, etc.) capability to entrap air that can be measured by determining a "blow ratio." An exemplary list of foaming agents includes but is not limited to potassium laurate, sodium lauryl sulfate, ammonium lauryl sulfate, ammonium stearate, potassium oleate, disodium octadecyl sulfosuccinimate, hydroxypropyl cellulose, etc.

(2) Stabilization Agent—used to enhance the stability of a froth's air bubbles against time and temperature. Examples include, but are not limited to, sodium lauryl sulfate, ammonium stearate, and hydroxypropyl cellulose.

(3) Wetting Agent—used to enhance the wettability of a film surface. Examples include, but are not limited to, sodium lauryl sulfate, potassium laurate, and disodium octadecyl sulfosuccinimate.

(4) Gelling Agent—used to stabilize air bubbles in the froth by causing a form of a gel that serves to reinforce cell walls. Examples include, but are not limited to, hydroxypropyl cellulose, hydroxyethyl cellulose, carboxymethyl cellulose, and other modified cellulose ethers.

Some foaming agents can deliver more than one of the functions listed above. Therefore, it is not necessary to use all four foaming agents in a frothable dispersion or solution.

Frothable dispersions or solutions of water-insoluble polymers can be in the form of dispersions or of solutions. With respect to dispersions, water-insoluble polymeric materials that are solids, such as powder, granules, etc., need to be converted into a frothable dispersion by mixing the polymer with water, air, and foaming agent(s) under certain processing conditions such as high pressure extrusion at an elevated temperature. With respect to solutions, water-soluble polymer materials that are solids, such as powder, granules, etc., need to be dissolved into a solution. Then, in most cases, the solution is mixed with air and a package of foaming agents to convert it into a froth.

Examples of dispersions according to the present disclosure include, but are not limited to, a polyolefin dispersion such as a polyethylene copolymer dispersion commercially available as HYPOD 8510 from Dow Chemical, Freeport, Tex., U.S.A.; and a polyisoprene dispersion, such as those sold under the brand name KRATON, commercially available from Kraton Polymers U.S. LLC, Houston, Tex., U.S.A., a polybutadiene-styrene block copolymer dispersion; a latex dispersion such as E-PLUS, commercially available from Wacker, Munich, Germany; a polyvinyl pyrrolidone-styrene copolymer dispersion or a polyvinyl alcohol-ethylene copolymer dispersion, both available from Sigma-Aldrich Co. LLC, Milwaukee, Wis., U.S.A.; and mixtures of these.

Examples of solutions according to the present disclosure include both synthetic and naturally-based water-soluble polymers. The synthetic water-soluble polymers include, but are not limited to, polyalcohols, polyamines, polyimines, polyamides, polycarboxlic acids, polyoxides, polyglycols, polyethers, polyesters, and copolymers and mixtures of these.

The naturally-based water-soluble polymers include, but are not limited to, modified cellulose, such as cellulose ethers and esters, modified starch, chitosan and its salts, carrageenan, agar, gellan gum, guar gum, other modified polysaccharides and proteins, and mixtures of these. In one particular aspect, the water-soluble film-forming components also include: poly(acrylic acid) and salts thereof; poly(acrylate esters); and poly(acrylic acid) copolymers. Other suitable water-soluble film-forming components include polysaccharides of sufficient chain length to form films such as, but not limited to, pullulan and pectin. For example, the water-soluble film-forming polymer can include additional monoethylenically unsaturated monomers that do not bear a pendant acid group, but are copolymerizable with monomers bearing acid groups. Such compounds include, for example, the monoacrylic esters and monomethacrylic esters of polyethylene glycol or polypropylene glycol, the molar masses (Mn) of the polyalkylene glycols being up to about 2,000, for example.

In another particular aspect, the water-soluble film-forming component is hydroxypropyl cellulose (HPC) sold by Ashland, Inc. under the brand name of KLUCEL. The water-soluble film-forming component can be present in any operative amount and will vary based on the chemical component selected, as well as on the end properties that are desired. For example, in the exemplary case of KLUCEL HPC, the biodegradable, water-soluble modifier component can be present in an amount of about 1-70 wt %, or at least about 1 wt %, such as at least about 5 wt %, or least about 10 wt %, or up to about 30 wt %, such as up to about 50 wt % or up to about 75 wt % or more, based on the total weight of the add-on, to provide improved benefits. Other examples of suitable first water-soluble biodegradable film-forming components include methyl cellulose (MC) sold by Ashland, Inc. under the brand name BENECEL; hydroxyethyl cellulose sold by Ashland, Inc. under the brand name NATROSOL; and hydroxypropyl starch sold by Chemstar (Minneapolis, Minn., U.S.A.) under the brand name GLUCOSOL 800. The water-soluble polymers in these chemistries include polyvinyl alcohol, polyethylene glycol, polyethylene oxide, hydroxypropyl starch, and hydroxypropyl cellulose.

A dispersion or solution can include water, a polyethylene-octene copolymer, and a copolymer of ethylene and acrylic acid. The polyethylene-octene copolymer can be obtained commercially from the Dow Chemical Corporation under the brand name AFFINITY (type 2980I) and the copolymer of ethylene and acrylic acid can be obtained commercially from the Dow Chemical Corporation under the brand name PRIMACOR (type 59081). PRIMACOR copolymer acts as a surfactant to emulsify and stabilize AFFINITY copolymer dispersion particles. Such a polyolefin dispersion can include an ethylene copolymer dispersion with a weight percent of a polyethylene-octene copolymer between 90 and 10 and a weight percent of an ethylene-acrylic acid copolymer between 10 and 90. In a specific example, HYPOD 8510 copolymer dispersion is a mixture of two polyethylene copolymers having 60 weight percent AFFINITY copolymer dispersion particles and 40 weight percent of PRIMACOR copolymer, and is available commercially from the Dow Chemical Corporation. The acrylic acid co-monomer is neutralized by potassium hydroxide to a degree of neutralization of around 80%. Therefore, in comparison, PRIMACOR copolymer is more hydrophilic than is AFFINITY copolymer. In a dispersion, PRIMACOR copolymer acts as a surfactant or a dispersant. Unlike PRIMACOR copolymer, AFFINITY copolymer, as suspended in a dispersion, takes on a form of tiny droplets with a diameter of a few microns. PRIMACOR copolymer molecules surround the AFFINITY copolymer droplets to form a micelle structure that stabilizes the droplets.

The new process of the present disclosure is quite different from the prior art process. The new process can use a high solid, high viscosity dispersion of (10 to 30 wt. %) and can contain a large amount of air bubbles (air volume is at least 10 times more than the dispersion volume). Desirably, the commercially-available HYPOD copolymer dispersion (42% solids) has a viscosity around 500 cps whereas water has a viscosity around 1 cps. A dispersion containing about 20% HYPOD copolymer can have a viscosity around 200 cps, a relatively high viscosity, while a dispersion having less than 1% HYPOD copolymer can have a viscosity close to water's viscosity (1 cp). After entrapping a high ratio of air, the viscosity of the frothed HYPOD copolymer dispersion has been increased.

Referring to FIG. 1, when a frothed dispersion is applied onto the non-porous dryer surface 23 of a dryer 22, a limited amount of water will be quickly evaporated therefrom. It is thought that the dispersion's slow evaporation, due to high solids combined with its high viscosity, will prevent the dispersion from completing the phase inversion and entrapped air from escaping. This results in a unique film-like structure on the dryer surface 23.

Figure 3:
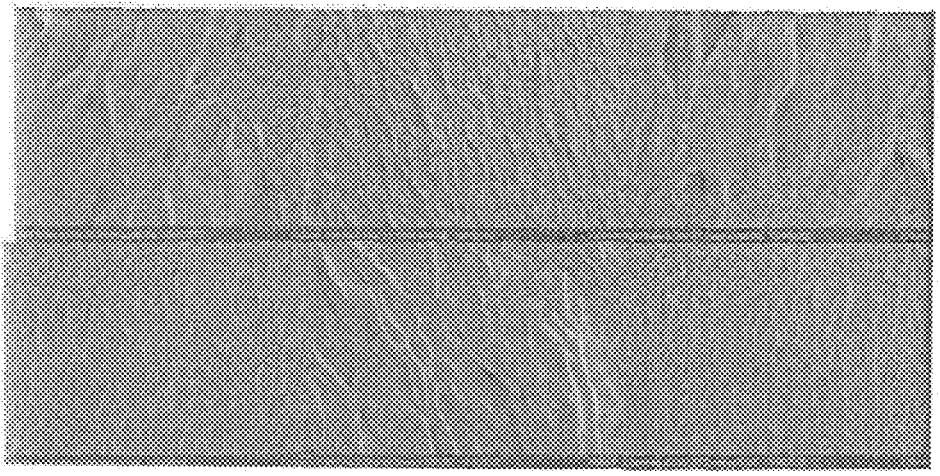
FIG. 3 is a series of scanning electron microscope (SEM) micrographs showing a surface view of the structure of a film-like structure prepared by one aspect of a method of the present disclosure.
Figure 4:
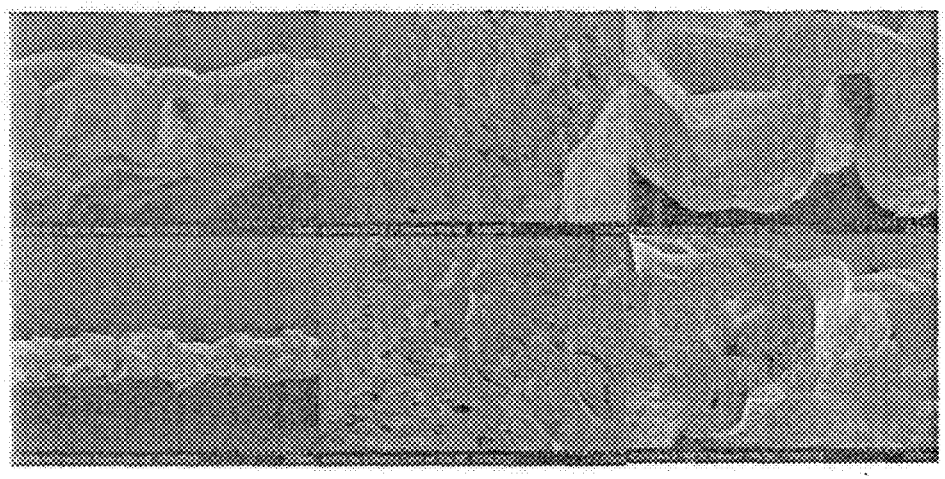
FIG. 4 is a series of SEM micrographs showing a cross-section view of the structure of a film-like structure prepared by one aspect of a method of the present disclosure.

The film-like structure is more appropriately and accurately described as a collapsed foam film-like structure. To better understand this distinction, a traditional film (such as cast, extruded or blown film) is generally planar without micropores. Such a traditional film is relatively smooth on both sides unless intentionally textured such as through embossing. In a cross-sectional view, voids of the traditional film are relatively parallel to the horizontal axis of the film. By contrast, the scanning electronic microscope photographs of FIGS. 3 and 4 show the view of a layer of the collapsed foam film-like structure of the present disclosure. Both sides (as shown in FIG. 3) of the collapsed foam film-like structure show a unique cellular structure that allow it to possess a difference in both mechanical and tactile properties when compared to traditional films. FIG. 4 illustrates magnified cross-sectional views of an embodiment of a collapsed foam film-like structure of the present disclosure. As shown, the frothed layer possesses voids of air entrapped due to the froth which leads to advantages provided by the present invention. Additionally, the cellular structure in the Z-direction can be easily seen wherein the voids of the layer are more perpendicular to the horizontal axis of the layer. Thus, the present disclosure does not just provide a film in the traditional sense of the word but provides an advantageous collapsed foam film-like structure via frothing and creping that provides the enhancements and improvements as described herein.

Froth Generating Process:

In general, preparing frothed chemicals uses a system that pumps both liquid and air into a mixer. The mixer blends the air into the liquid to produce a froth that inherently includes a plurality of small air bubbles. The froth exits the mixer and flows to an applicator.

One parameter to define the quality of frothed dispersion or solution is the blow ratio, which is defined by ratio of volume of small air bubbles entrapped by dispersion chemical to the volume of the dispersion before mixing. For example, at a blow ratio of 10:1, a dispersion flow rate of 1 liter/minute will be able to entrap 10 liters/minute of air into its liquid and produce a total froth flow rate of 11 liters per minute.

To achieve a high blow ratio, both the mechanical mixing and the frothing capability of the dispersion or solution are determining factors. If a chemical can only hold or entrap air volume up to a blow ratio of 5, no matter how powerful a frothing process is, it won't be able to produce a stable froth having a blow ratio of 10. Any extra air beyond the blow ratio of 5 will release out of the froth system once the mechanical force is removed. In other words, any entrapped air higher than the dispersion's air containment capability will become unstable. Most of such unstable air bubbles will escape from the froth (debubbling) immediately after mechanical agitation is stopped.

FIG. 1 schematically illustrates a system 10 that can generate the frothed dispersion or solution according to the present disclosure. To begin, frothable chemicals (e.g. HYPOD copolymer dispersion, KRATON polyisoprene dispersion, etc.) are placed in a chemical tank 12. The chemical tank 12 is connected to a pump 14. It can be desirable to modify piping 13 between the chemical tank 12 and pump 14 so that one can transmit the frothable chemicals to two different sizes of pumps. Desirably the chemical tank 12 is situated at a level elevated above the pump 14 to keep the pump 14 primed.

One optional small secondary pump (not shown) can be used to run the frothing process at slow speeds relative to pump 14. In one example, the larger primary pump 14 is capable of producing flow rates up to 25 liters/minute liquid flow-rate for high application speeds and/or high concentration dispersion or solution. As an example, the smaller, secondary pump is capable of liquid flow rates up to 500 cc/minute and/or concentration dispersion or solution.

A flow meter 16 is situated between the pump(s) 14 and a foam mixer 18. Liquid flow rates are calculated from desired concentration, chemical solids, line-speed, and applicator width. The flow rate can range from about 5:1 to 50:1. When using the small secondary pump, its flow rate ranges from 10 to 500 cc/minute. When using the large primary pump 14, its flow rate ranges from 0.5 to 25 liter/minute. A 20 liter/minute air flow meter is selected when using the small secondary pump. There is a 200 liter/minute air flow meter to use when running the larger primary pump 14.

In one aspect, the foam mixer 18 is used to blend air into the liquid mixture of frothable chemicals to create small air bubbles in the froth. Air is metered into the system 10 using certain liquid flow rates and blow ratios as discussed above. Desirably, the foam mixer 18 having a size of 25.4 cm (10 inches) can be used to generate froth. One possible foam mixer 18 is a CFS-10 inch Foam Generator from Gaston Systems, Inc. of Stanley, N.C., U.S.A.

In one aspect, the rotational speed of the foam mixer 18 can be limited to about 600 rpm. The speed of the foam mixer 18 in this process is dependent upon the dispersion's or solution's ability to foam (i.e., its capability of entrapping air to form stable bubbles). If the dispersion or solution foams easily, a lower speed is generally required. If the dispersion or solution does not foam easily, a higher speed is generally required. The higher mixer speed helps to speed up the foam equilibrium or optimal blow ratio. A normal speed for the foam mixer 18 is about 20%-60% of the maximum speed. The type of and/or amount of foam agent in addition to the chemistry of the frothed dispersion or solution also has an effect on the mixer speed requirement.

The froth is checked for bubble uniformity, stability, and flow pattern. If bubble uniformity, stability, and flow pattern are not to desired standards, adjustments can be made to flow rates, mixing speeds, blow ratio, and/or chemical compositions of the solutions/dispersions before directing the froth to the applicator 24.

In one aspect of the disclosure, HYPOD copolymer dispersion or other chemistries to be frothed and used for the creping package are blended and added to the chemical tank 12. Dilute solutions of HYPOD copolymer dispersion (<10% total solids) and other hard-to-froth chemistries generally require something added to the formulation to increase viscosity and foamability. For example, hydroxypropyl cellulose or other foaming agents or surfactants can be used to produce a stable froth for uniform application onto the heated and non-permeable dryer surface 23 of a dryer 22.

Surface Coating Process:

The process of the present disclosure can apply high-solid frothed dispersion or solution onto the dryer surface 23. Air is used to dilute a dispersion having up to 65 wt % of solids, or up to 20% solids, depending on the content of PRIMACOR copolymer described above.

The high-solid coating process of the present disclosure exhibits four product and process benefits: (1) softer surface due to the unique micro-structure of the layer; (2) less chemical waste due to close and direct application of the frothed dispersion or solution; (3) no need to use soft or deionized water due to the high ratio of chemistry to water (for example, a chemical such as HYPOD copolymer dispersion becomes unstable when it is exposed to a large quantity of hard water (i.e., a solid level of 1% or less); and (4) less drying energy required to dry the frothed dispersion or solution.

Referring to FIG. 1, in one aspect of the disclosure, the frothed chemicals are applied to the dryer surface 23 via an applicator 24. The froth applicator 24 is placed close to the dryer surface 23 (0.64 cm or ¼ inch) for uniform froth distribution onto the dryer surface 23. Such an applicator is desired to better ensure direct contact of the frothed dispersion or solution to the dryer surface 23, especially during high-speed operations.

Creping Process:

Creping is part of the film manufacturing process wherein the film is scraped off the surface of a rotating dryer (e.g. a Yankee Dryer or heated cylinder) via a doctor or creping blade assembly. The creping process generally produces a material with a creped or undulating macrostructure or profile or cross-section, as seen in FIG. 4. Either one or both opposed faces of the material can be undulant.

Figure 2:
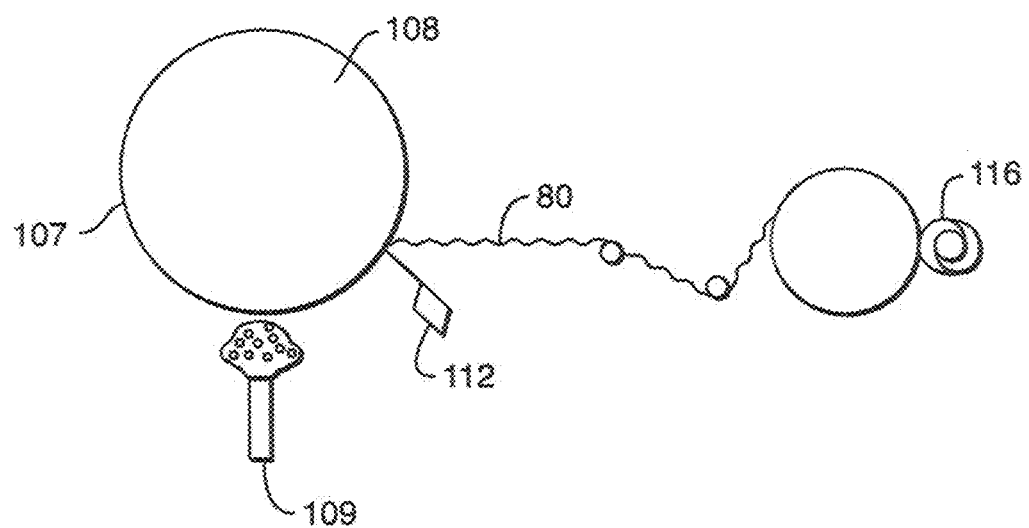
FIG. 2 is a schematic view of process steps used to create another aspect of a froth and film-like structure according to the present disclosure.

FIG. 2 illustrates a simple example of the application of a frothed dispersion or solution being applied as part of a creping process. An applicator 109 applies the frothed dispersion or solution of the present disclosure to the dryer surface 107 of the dryer drum 108. The applicator 109 has to be positioned as close to the dryer surface 107 as possible. In one aspect, the acceptable distance will be in a range from 0.5 mm to 50 mm. This allows the frothed chemicals to come in direct contact with the dryer surface 107.

The film-like structure 80 is creped from the dryer surface 107 using a creping blade 112. Once creped from the dryer drum 108, the film-like structure 80 is wound into a roll 116.

In addition, multiple-layer structures can be manufactured by applying successive frothed dispersions or solutions (with the same or different compositions) to the heated dryer surface 23. The second and succeeding frothed dispersions or solutions can be added prior to the previous frothed dispersion or solution becoming a film-like structure, or after the previous dispersion or solution becomes a film-like structure. In this manner, a multiple-layered film-like structure is produced. The ability to alter the chemistry of the various layers without the concern of matching rheology, as is required in multi-layer film melt extrusion processes, is an advantage and provides new opportunities for the development of substrates with properties tailored for specific applications.

Another benefit of using the approach described herein to produce a thin film-like structure is that it is very easy to achieve a uniform polymer-blend film-like structure. More than one type of polymer can be incorporated into the film-like structure through blending different dispersions or solutions or through blending different frothed dispersions or frothed solutions. Though different phases might still exist, the polymers' dispersibility and interpenetrating network structure are anticipated to be quite different from any blend film obtained through melt extrusion processes.

EXAMPLE

The following example was prepared to demonstrate the process feasibility and product benefits. All the samples were prepared using the procedure as described.

A commercial HYPOD copolymer dispersion was diluted with municipal water to a 30% HYPOD copolymer solid level and then frothed by the Gaston unit described above. The stable froth was applied to the hot drum surface of a 60-inch diameter calendar dryer. The film-like structure formed from the cured HYPOD copolymer dispersion was scraped off the dryer surface.

Process Conditions:
 % Solids in dispersion: 30% HYPOD 8510 copolymer dispersion
 Dryer Temperature: 260-300 deg F.
 Dispersion Flow rate: 100-500 cc/min
 Mixer Speed: 20-60%
 Blow ratio: 5-30
 Basis Weight: Basis weight was measured by using multiple 10×10 cm pieces that were cut and weighed and normalized to their known area.
 Tensile Strength: The stress-elongation or the load elongation behavior was obtained at room temperature using an MTS (Materials Testing System) electromechanical test frame. Film-like structure samples of rectangular shape at approximately a 2-inch width and a 7-inch length were clamped in the grips of the MTS frame at a gauge length of 3 inches. Samples were then pulled to failure at a cross-head displacement rate of 20"/minute. In many cases the load-elongation data was used and reported as is. In some cases, the engineering stress was calculated by normalizing the load with respect to the initial cross-sectional area. The extension ratio and elongation were calculated from knowledge of the change in length and the original gauge length of the sample. The modulus, which is a measure of the rigidity of the sample, was calculated by mathematical modeling of the stress and extension ratio using Rubber Elasticity Theory. Samples were measured in triplicate.

Air Permeability: Air permeability testing was done to understand material breathability. Testing of materials was done using a 100 cm² head size and Textest FX 3300 air permeability tester according to ASTM D737-96. Samples were measured in triplicate and data averaged.

Hydrohead (Hydrostatic Pressure Test): Hydrostatic pressure is a measure of the barrier properties of a material. The measurements were taken using a FX 3000 hydro static head tester in accordance with INDA Test Method IST 80.6 (98). Samples are clamped into place over a water-filled test head (26 cm²). Water pressure underneath the sample is increased at 60 mbar/min and water pressure is recorded when the third water droplet strikes through the material. Samples were measured in triplicate and data averaged.

Film-like structure Properties: Tensile MD and CD for film-like structure

|    |          | Peak Load (gf) | Peak Stretch (%) | Peak Energy g * cm |
|----|----------|----------------|------------------|--------------------|
| MD | Average  | 248.95         | 83.5             | 1209.87            |
|    | Std. Dev | 24.38          | 18.1             | 351.68             |
| CD | Average  | 230.21         | 44.3             | 536.67             |
|    | Std. Dev | 30.82          | 6                | 137.29             |

Hydrohead, Air Permeability, and weight:

| Property | Value |
|----------|-------|
| Film-like structure Weight | 0.217 g |
| Hydrohead | 2.83 mbar |
| Air Permeability | 0.64 cfm |

It will be appreciated that details of the foregoing examples, given for purposes of illustration, are not to be construed as limiting the scope of this disclosure. Although only a few exemplary aspects of this disclosure have been described in detail above, those skilled in the art will readily appreciate that many modifications are possible in the examples without materially departing from the novel teachings and advantages of this disclosure. For example, features described in relation to one example can be incorporated into any other example of the disclosure.

Accordingly, all such modifications are intended to be included within the scope of this disclosure, which is defined in the following claims and all equivalents thereto. Further, it is recognized that many aspects can be conceived that do not achieve all of the advantages of some aspects, particularly of the preferred aspects, yet the absence of a particular advantage shall not be construed to necessarily mean that such an aspect is outside the scope of the present disclosure. As various changes could be made in the above constructions without departing from the scope of the disclosure, it is intended that all matter contained in the above description shall be interpreted as illustrative and not in a limiting sense.

What is claimed is:

1. A method of forming a collapsed foam film-like structure, the method comprising:
   a) positioning a composition applicator adjacent to a heated non-permeable dryer surface;
   b) producing a first frothed dispersion or frothed solution from a first dispersion or solution;
   c) applying the first frothed dispersion or frothed solution to the dryer surface;
   d) allowing the first frothed dispersion or frothed solution to convert to a first collapsed foam film-like structure; and
   e) scraping only the first collapsed foam film-like structure from the dryer surface.

2. The method of claim 1, wherein the steps a-e are performed in sequential order.

3. The method of claim 1, further comprising producing a second frothed dispersion or frothed solution from a second dispersion or solution, applying the second frothed dispersion or frothed solution to the applied first frothed dispersion or frothed solution, and allowing the second frothed dispersion or frothed solution to convert to a second collapsed foam film-like structure, wherein scraping includes scraping only the first and second collapsed foam film-like structures from the dryer surface.

4. The method of claim 3, wherein the first frothed dispersion or frothed solution is allowed to convert to a collapsed foam film-like structure prior to applying the second frothed dispersion or frothed solution to the applied first frothed dispersion or frothed solution.

5. The method of claim 3, further comprising producing a third frothed dispersion or frothed solution from a third dispersion or solution, applying the third frothed dispersion or frothed solution to the applied second frothed dispersion or frothed solution, and allowing the third frothed dispersion or frothed solution to convert to a third collapsed foam film-like structure, wherein scraping includes scraping only the first, second, and third collapsed foam film-like structures from the dryer surface.

6. The method of claim 1, further comprising producing a second frothed dispersion or frothed solution from a second dispersion or solution, and blending the first frothed dispersion or frothed solution and the second frothed dispersion or frothed solution, wherein the applying step applies the blended frothed dispersion or frothed solution.

7. The method of claim 1, further comprising blending a second dispersion or solution with the first dispersion or solution prior to frothing, wherein producing includes producing a blended frothed dispersion or frothed solution, wherein applying includes applying the blended frothed dispersion or frothed solution to the dryer surface, wherein allowing includes allowing the blended frothed dispersion or frothed solution to convert to a blended collapsed foam film-like structure, and wherein scraping includes scraping only the blended collapsed foam film-like structure from the dryer surface.

8. The method of claim 7, further comprising producing a third frothed dispersion or frothed solution from a third dispersion or solution, and applying the third frothed dispersion or frothed solution to the applied blended first and second frothed dispersions or frothed solutions, and allowing the third frothed dispersion or frothed solution to convert to a collapsed foam film-like structure.

9. The method of claim 1, wherein the first dispersion or solution is a polyolefin dispersion.

10. The method of claim 9, wherein the polyolefin dispersion is an ethylene copolymer dispersion with a weight percent of a polyethylene-octene copolymer between 90 and 10 and a weight percent of an ethylene-acrylic acid copolymer between 10 and 90.

11. The method of claim 1, further comprising adding one or more of a solid particle and a non-web fiber into the first dispersion or solution, wherein scraping includes scraping only the collapsed foam film-like structure including the one or more of a solid particle and a non-web fiber from the dryer surface.

12. The method of claim 1, further comprising adding one or more of a solid particle and a non-web fiber into the first frothed dispersion or frothed solution, wherein scraping includes scraping only the collapsed foam film-like structure including the one or more of a solid particle and a non-web fiber from the dryer surface.

13. The method of claim 1, further comprising adding one or more of a solid particle and a non-web fiber to the dryer surface or to the first frothed dispersion or frothed solution prior to the conversion to a collapsed foam film-like structure, wherein scraping includes scraping only the collapsed foam film-like structure including the one or more of a solid particle and a non-web fiber from the dryer surface.

14. A method of forming a collapsed foam film-like structure, the method comprising:
    a) positioning a composition applicator adjacent to a heated non-permeable dryer surface;
    b) producing a first dispersion or solution;
    c) producing a second dispersion or solution;
    d) blending the first dispersion or solution and the second dispersion or solution to produce a blended dispersion or solution;
    e) frothing the blended dispersion or solution;
    f) applying the blended frothed dispersion or frothed solution to the dryer surface;
    g) allowing the blended frothed dispersion or frothed solution to convert to a collapsed foam film-like structure; and
    h) scraping only the collapsed foam film-like structure from the dryer surface.

15. The method of claim 14, wherein the steps a-h are performed in sequential order.

16. The method of claim 14, further comprising adding one or more of a solid particle and a non-web fiber into one of the first dispersion or solution, second dispersion or solution, or blended dispersion or solution, wherein scraping includes scraping only the collapsed foam film-like structure including the one or more of a solid particle and a non-web fiber from the dryer surface.

17. The method of claim 14, wherein the first dispersion or solution is an ethylene copolymer dispersion with a weight percent of a polyethylene-octene copolymer between 90 and 10 and a weight percent of an ethylene-acrylic acid copolymer between 10 and 90.

\* \* \* \* \*